US007316286B2

(12) United States Patent
Hillary

(10) Patent No.: US 7,316,286 B2
(45) Date of Patent: Jan. 8, 2008

(54) PRESSURE WASHER WITH VIBRATION DAMPENER

(75) Inventor: Gregory J. Hillary, Hazel Green, WI (US)

(73) Assignee: Mi-T-M Corporation, Peosta, IA (US)

( * ) Notice: Subject to any disclaimer, the term of this patent is extended or adjusted under 35 U.S.C. 154(b) by 205 days.

(21) Appl. No.: 10/919,981

(22) Filed: Aug. 17, 2004

(65) Prior Publication Data

US 2006/0038034 A1 Feb. 23, 2006

(51) Int. Cl.
*B60K 1/00* (2006.01)
*B05B 3/00* (2006.01)
*B05B 3/18* (2006.01)

(52) U.S. Cl. ........................ 180/291; 239/149; 239/722

(58) Field of Classification Search ................ 239/722, 239/149, 600; 180/228
See application file for complete search history.

(56) References Cited

U.S. PATENT DOCUMENTS 575,375 A * 1/1897 Reilly ........................ 239/149
2,041,654 A * 5/1936 Vance et al. ................. 56/16.7
2,549,692 A 4/1951 Lentz
2,610,010 A 9/1952 Doge
3,037,764 A 6/1962 Paulsen
3,940,065 A * 2/1976 Ware et al. ................. 239/146
3,955,900 A * 5/1976 Vinci ......................... 417/361
4,432,528 A * 2/1984 Kretchman et al. ......... 248/603
4,629,359 A 12/1986 Sengupta
4,806,437 A 2/1989 Yokoi et al.
5,362,291 A * 11/1994 Williamson, IV ............ 494/18
5,449,140 A * 9/1995 Lastowski ................... 248/681
5,765,818 A 6/1998 Sabatino et al.
6,178,729 B1 * 1/2001 Vastag ........................ 56/17.5
D467,692 S * 12/2002 Morgan et al. .............. D32/15
6,557,816 B2 5/2003 Yoshida
6,695,235 B2 * 2/2004 Faller et al. ................ 239/722
6,719,482 B2 4/2004 Morita
2002/0066611 A1 * 6/2002 Lane et al. ................. 180/228

OTHER PUBLICATIONS

Devilbiss Air Power Company, General Manual for Devilbiss/Excell Pressure Washers, D21 684, Rev. 0, Sep. 1, 2000, p. 14.*
Product Manuel, Kärcher G 2401 OH, obtained from http://www.karcher-usa.com/support/downloads/pdfs/usermanuals/9139-1550.pdf, Jun. 2004, pp. 1-13.*
Alfred Karcher GmbH Co. brochure-Dirtblaster 1750G, undated.
Alfred Karcher GmbH Co. catalog, p. 7-cold water high pressure washers, photo of model HD800D, undated.
Printout from website of Alfred Karcher GmbH Co. regarding HD 1050 DE diesel-powered cold water high-pressure cleaner.

* cited by examiner

*Primary Examiner*—Kevin Shaver
*Assistant Examiner*—James S. Hogan
(74) *Attorney, Agent, or Firm*—Allan L. Harms; Wenzel & Harms, P.C.

(57) ABSTRACT

A light weight portable pressure washer with improved vibration damping includes a plate member disposed between the engine and the supporting frame of the pressure washer. The plate member is mounted to the base of the engine and extends laterally beyond the base of the engine and is supported on the frame of the pressure washer by multiple elastomeric vibration isolators. The plate member and the frame may be constructed of stainless steel or of aluminum, and the frame components may be joined without welding.

4 Claims, 4 Drawing Sheets

PRESSURE WASHER WITH VIBRATION DAMPENER

BACKGROUND OF THE INVENTION

This invention pertains to pressure washing machines and particularly to pressure washing machines supported on wheels.

Many portable pressure washing machines are mounted on wheels and include an internal combustion engine and an associated pump mounted on a frame. The operation of the engine creates substantial vibration in the frame of the pressure washer and this vibration can be translated into movement of the pressure washing machine along the surface on which it rests. This is highly undesirable. In order to reduce such undesirable movement of the machine when it is running, it has been usual practice to fabricate the frames for the machines from heavy steel plate, with the frame components welded together, and with stiffening ribs to rigidify the frame to cause machine vibration to be transmitted from the engine to the wheels where the vibrations can be absorbed sufficiently to allow the machine to remain at rest when the motor is running.

Developing demand for lighter weight portable pressure washing machines has not been satisfactorily met because the fabrication of pressure washer frames from aluminum, thinner gauge mild steel or stainless steel, or from other lighter weight materials does not result in the transmission of sufficient engine vibration to the wheels such that pressure washers with frames fabricated from lighter weight materials tend to vibrate excessively and "walk" along the surface on which they rest.

One manufacturer of pressure washing machines employs rubber vibration isolators mounted between the internal combustion engine and the machine frame. This structure has not been found to sufficiently dampen the vibrations to prevent the undesired movement of the pressure washing machine when its engine is running.

A need exists for a vibration absorbing structure of low cost and low complexity which will permit pressure washing machines to be fabricated with frames of lightweight materials without the need to use brakes or wheel blocks to keep the pressure washing machine in place when in operation.

BRIEF SUMMARY OF THE INVENTION

The present invention provides an improved vibration absorbing structure for a portable pressure washing machine supported on wheels.

A vibration plate whose area substantially exceeds the footprint of the engine of the pressure washing machine is mounted to the base of the engine. Multiple vibration isolating elastomeric cylinders are interposed between the vibration plate and the frame of the pressure washer. The vibration plate may be rectangular and may extend from beneath the engine nonsymmetrically with the plate extending furthest from under the side of the engine from which the engine drive shaft extends. The isolators are positioned near each corner of the vibration plate and are fixed to both the vibration plate at their upper ends and to the machine frame at their lower ends. The addition of the vibration absorbing structure permits frame components to be bolted together rather than welded, allows use of lighter weight frame materials such as aluminum and thin gauge mild steel or stainless steel to be used for frame components, eliminates the need for stiffening ribs on frame components, and reduces wear on the pressure washer components.

Therefore objects of the invention include: providing a lighter weight portable pressure washing machine which will remain at rest during operation; providing a portable pressure washing machine with a frame which can be fabricated from stainless steel or aluminum; and providing a portable pressure washing machine with a frame which requires no stiffening ribs or welding of component parts. These and other objects will be understood from a careful review of the detailed description and claims which follow.

BRIEF DESCRIPTION OF THE SEVERAL VIEWS OF THE DRAWING(S)

DETAILED DESCRIPTION OF THE INVENTION

Figure 1:
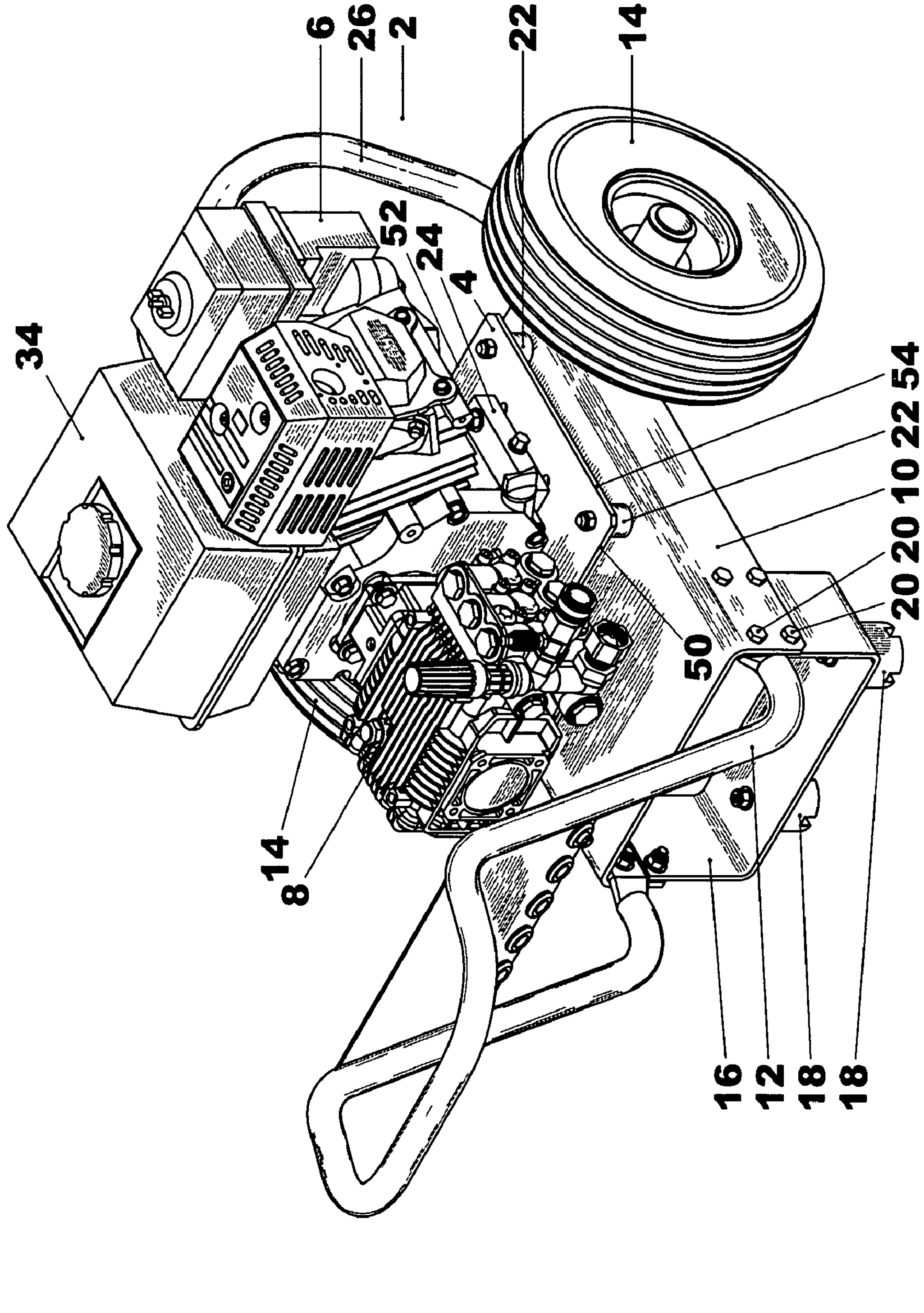
FIG. 1 is a front left perspective of a portable pressure washer according to the invention.
Figure 2:
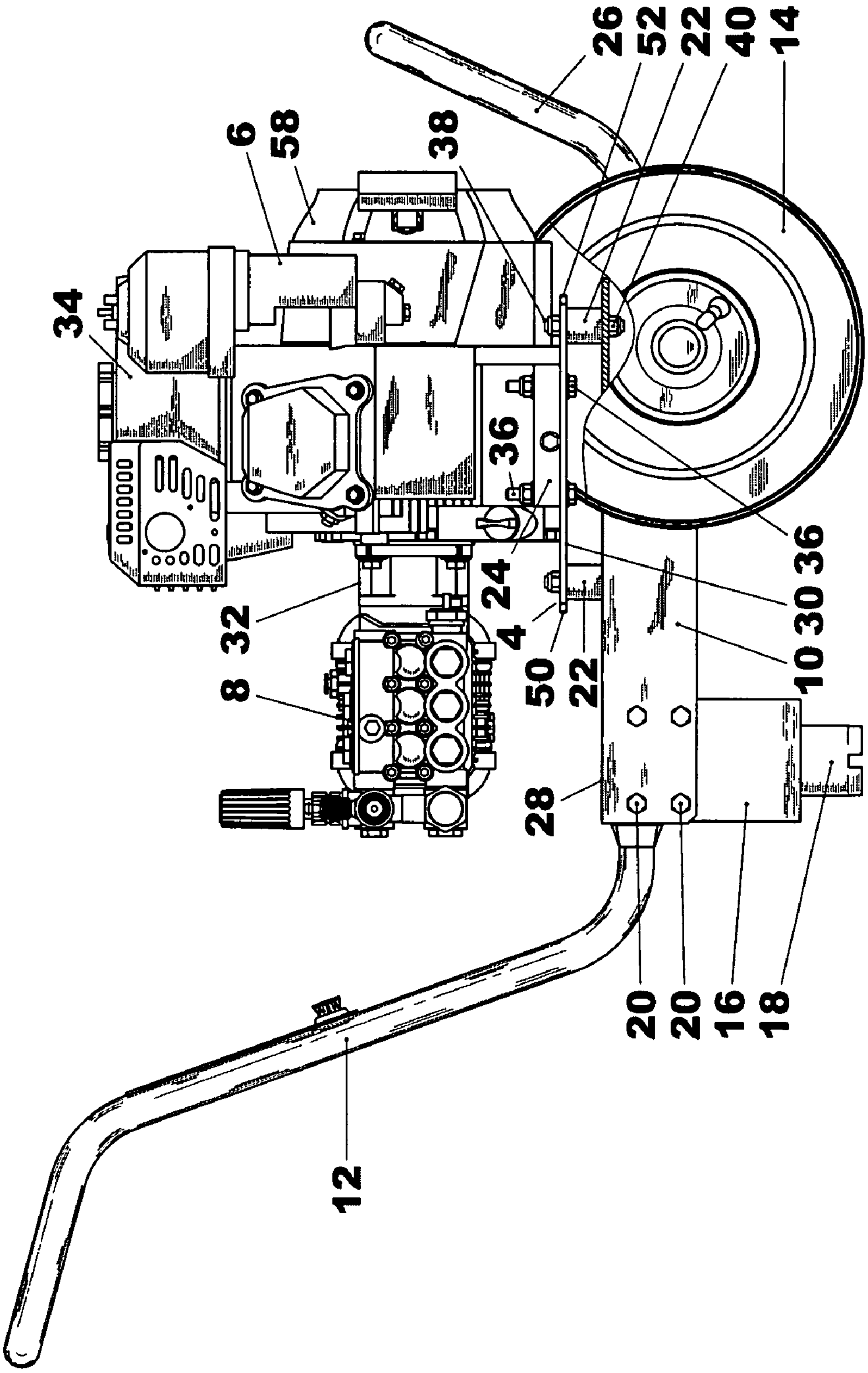
FIG. 2 is a front elevation of the pressure washer of FIG. 1 with part of the wheel cut away.

A portable pressure washer 2 exemplary of the present invention is illustrated in FIGS. 1 and 2. Pressure washer 2 comprises a frame 10 supported on wheels 14 and feet 18 which preferably are elastomeric. A water pump 8 is supported laterally on engine 6 and is driven thereby. Engine 6 is mounted at its base 24 to vibration dampening assembly 4 which is supported upon frame 10 by plural isolators 22. A handle 12 is fixed by bolts 20 to frame 10 such that a user may move pressure washer 2 about on its wheels 14. Frame 10 is provided with a curved bumper bar 26 opposing handle 12 so that two persons may lift pressure washer 2 when needed and to provide protection for components of the engine 6 including for its gas tank 34. Frame 10 includes rest bracket 16 which depends from handle end 28 of frame 10 and is fixed to frame 10 by bolts 20. Because of the vibration attenuation provided by vibration dampening assembly 4, frame 10 and rest bracket 16 may be fabricated from aluminum or stainless steel and fixed together by bolts 20 rather than by welding. Hence, pressure washer 2 may be a lighter weight machine than prior art pressure washers which have frames which are made of mild steel with connection welds, ribs, bends, and flanges to improve on vibration attenuation.

In examining FIGS. 1 and 2, it can be seen that vibration dampening assembly 4 is not mounted symmetrically to either base 24 of engine 6 or to top deck 28 of frame 10. Vibration dampening assembly comprises a plate member 30 which is bolted to the base 24 of engine 6 by mounting bolts 36. Plate member 30 is disposed substantially in parallel to the top deck 28 of frame 10 and is supported above top deck 28 by isolators 22. Plate member 30 is sized such that its area is larger than the area of the base 24 of engine 6 and therefore plate member 30 extends from below base 24 on all sides thereof, and preferably, a portion of plate member 30 underlies pump coupler 32 such that first edge 50 of plate member 30 is disposed below pump coupler 32. Second edge 52 of plate member 30 opposes first edge 50 thereof and extends beyond base 24, as do side edges 54, 56 (See FIG. 4). Plate member 30 does not underlie all of engine 6, that is, second edge 52 of plate member 30 lies beneath flywheel assembly 58 of engine 6.

Plate member 30 is substantially planar and constructed of thin rigid metal, preferably the same metal as frame 10 which may be constructed of light weight mild or stainless steel, or of aluminum.

Vibration isolators 22 support plate member 30 above top deck 28 and are fixed to plate member 30 and to top deck 28 by end studs 38.

Figure 3:
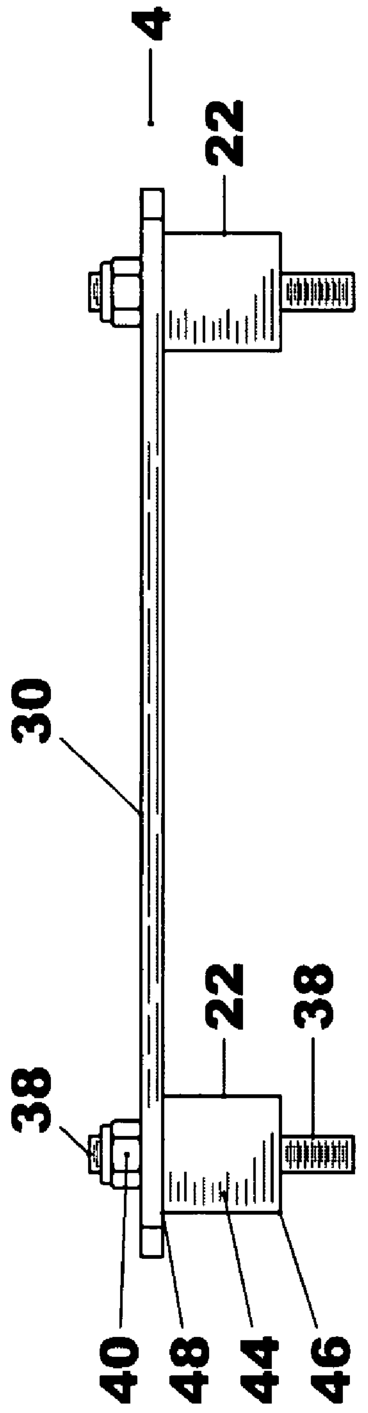
FIG. 3 is an enlarged front elevation of the vibration dampening plate assembly of the invention.
Figure 4:
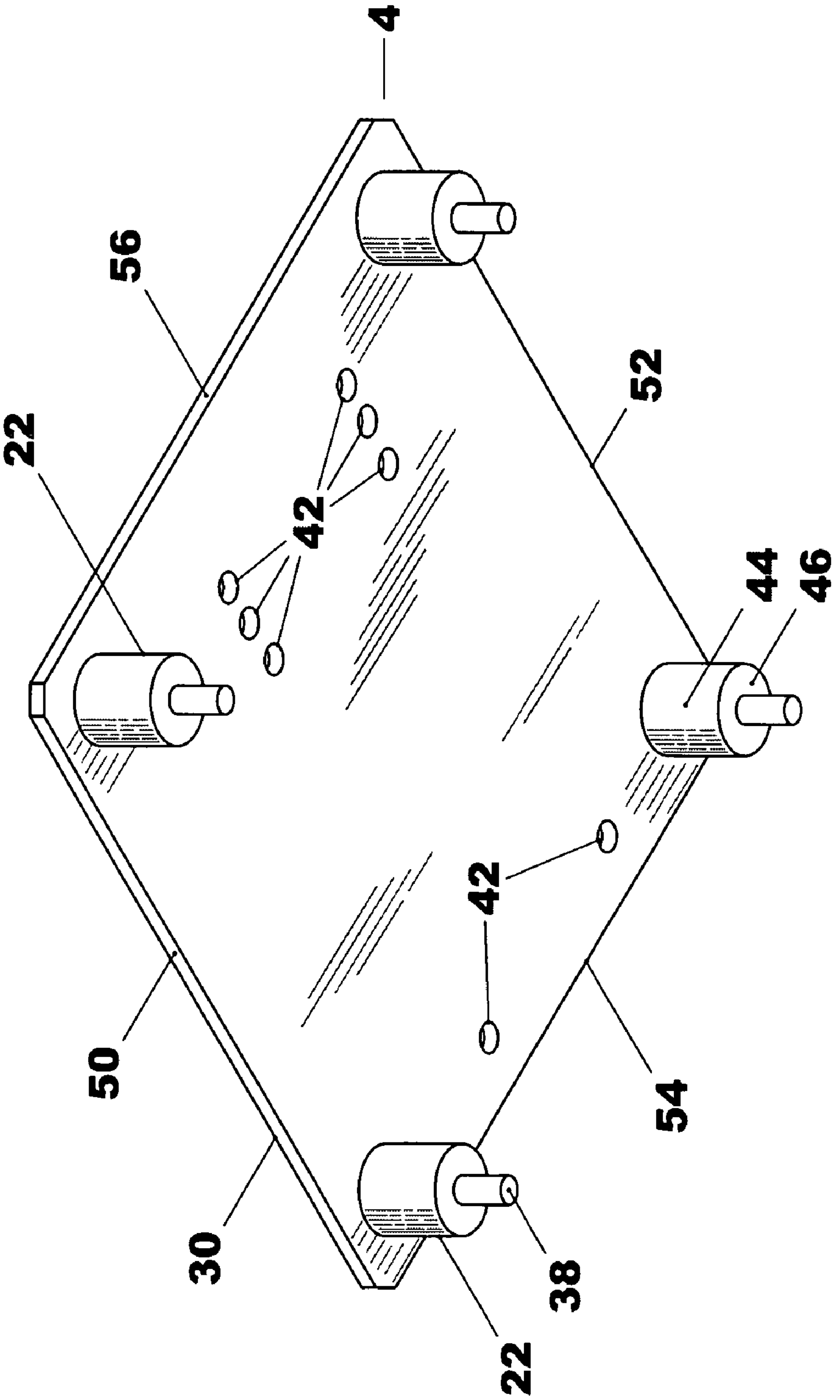
FIG. 4 is a bottom perspective of the vibration dampener plate assembly of the invention.

Referring now to FIGS. 3, 4, the vibration damping assembly 4 preferably comprises a rectilinear, preferably generally square, plate member 30 to which end studs 38 of isolators 22 are retained by nuts 40 which may be lock nuts. Similarly, isolators 22 are mounted to top deck 28 of frame 10 (see FIGS. 1, 2) by studs 38 which are received in holes in top deck 28 and retained thereto by nuts 40.

Multiple bolt holes 42 are provided in plate member 30 such that engines 6 of varying sizes can be mounted to plate member 30 by using alternative sets of holes 42 for mounting bolts 36.

Isolators 22 comprise solid elastomeric cylinders 44, preferably of rubber or the like, with a hardness of approximately fifty durometer. Studs 36 are coaxial with isolators 22 and do not extend through elastomeric cylinder 44 but rather separate studs 36 extend from the opposing first and second ends 46, 48 respectively of each elastomeric cylinder 44. Each elastomeric cylinder 44 is preferably one inch in diameter and one inch in length though variations of these dimensions may be found to be useful depending on the size and weight of engine 6 and pump 8 to be supported.

It can be seen in FIG. 4 that isolators 22 are positioned near each corner of plate member 30 and are arranged substantially symmetrically on plate member 30.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto and by their equivalents.

Having described the invention, I claim:

1. A portable pressure washing machine comprising
an internal combustion engine supported on a frame,
the internal combustion engine having a base,
the frame supported on ground engaging wheels,
the internal combustion engine drivingly coupled to a water pump supported on the frame,
a plate member fixed directly to the base of the engine, the plate member extending horizontally beyond the base of the engine,
the plate member spaced away from a substantially horizontal top surface of the frame,
a part of the engine extending horizontally beyond the plate member,
a plurality of spaced apart isolators interposed between the plate member and the top surface of the frame,
the isolators supporting the plate member above the top surface of the frame.

2. A portable pressure washing machine comprising
an engine supported on a frame,
the engine having a base,
the frame supported on ground engaging wheels,
the engine drivingly coupled to a water pump supported on the frame,
a plate member fixed directly to the base of the engine, the plate member extending horizontally beyond the base of the engine,
the plate member spaced away from a substantially horizontal top surface of the frame,
a plurality of spaced apart isolators interposed between the plate member and the top surface of the frame,
the isolators supporting the plate member above the top surface of the frame,
the water pump is supported laterally upon the engine,
a portion of the plate member underlies the water pump,
a part of the engine extending horizontally beyond the plate member.

3. A portable pressure washing machine comprising
an engine supported on a frame,
the engine having a base,
the frame supported on ground engaging wheels,
the engine drivingly coupled to a water pump supported on the frame,
a plate member fixed directly to the base of the engine, the plate member extending horizontally beyond the base of the engine,
the plate member spaced away from a substantially horizontal top surface of the frame,
a plurality of spaced apart isolators interposed between the plate member and the top surface of the frame,
the isolators supporting the plate member above the top surface of the frame,
each isolator fixed to the plate member and to the top surface of the frame,
each isolator disposed near an edge of the plate member,
each isolator comprises an elastomeric cylinder,
the plate member is rectangular,
each isolator is disposed at a corner of the plate member,
each isolator has a vertically oriented longitudinal axis,
each isolator comprises a threaded bolt extending axially from each opposing longitudinal end thereof,
each bolt is separated from the other bolt by a portion of the elastomeric cylinder,
the water pump supported laterally upon the engine,
the engine is an internal combustion engine,
a portion of the plate member underlying the water pump,
a part of the engine extending horizontally beyond the plate member.

4. A portable pressure washing machine comprising
an engine supported on a frame,
the engine having a base,
the frame supported on ground engaging wheels,
the engine drivingly coupled to a water pump supported on the frame,
a plate member fixed directly to the base of the engine,
the plate member extending horizontally beyond the base of the engine,
the plate member having a periphery with surrounded by free edges,
the plate member spaced away from the frame,
a plurality of spaced apart isolators interposed between the plate member and the frame,
the isolators supporting the plate member above the frame.

* * * * *